United States Patent [19]

Miyazaki et al.

[11] Patent Number: 4,883,309
[45] Date of Patent: Nov. 28, 1989

[54] FRONT STRUCTURE FOR MODULAR VEHICLE BODY

[75] Inventors: Kenichi Miyazaki, Sagamihara; Katsumi Nakamura, Fujisawa; Taro Hagiwara, Sagamihara, all of Japan

[73] Assignee: Nissan Motor Co., Ltd., Yokohama City, Japan

[21] Appl. No.: 188,507

[22] Filed: Apr. 29, 1988

[30] Foreign Application Priority Data

Apr. 30, 1987 [JP] Japan ................................ 62-107387

[51] Int. Cl.⁴ ............................................. B62D 25/00
[52] U.S. Cl. .................................. 296/194; 296/192; 296/30
[58] Field of Search ............... 296/194, 196, 197, 193, 296/192, 187, 203, 29, 30

[56] References Cited

U.S. PATENT DOCUMENTS

| 2,988,397 | 6/1961 | Brueder | 296/196 |
| 3,021,172 | 2/1962 | Fiala et al. | 296/203 |
| 3,541,668 | 11/1970 | Wessells, III et al. | 29/496 |
| 4,264,101 | 4/1981 | Gotoh | 296/194 |
| 4,391,465 | 7/1983 | Piano | 296/208 |
| 4,699,419 | 10/1987 | Kawase et al. | 296/192 |
| 4,717,198 | 1/1988 | Komatsu | 296/192 |
| 4,718,712 | 1/1988 | Nakatani | 296/189 X |
| 4,718,713 | 1/1988 | Sakamoto et al. | 296/189 X |
| 4,730,870 | 3/1988 | DeRees | 296/192 X |

FOREIGN PATENT DOCUMENTS

| 76934 | 4/1983 | European Pat. Off. | |
| 141959 | 5/1985 | European Pat. Off. | |
| 188837 | 7/1986 | European Pat. Off. | |
| 256931 | 2/1988 | European Pat. Off. | |
| 3119666 | 1/1982 | Fed. Rep. of Germany | |
| 3119572 | 3/1982 | Fed. Rep. of Germany | |
| 3143503 | 6/1982 | Fed. Rep. of Germany | |
| 55-36117 | 3/1980 | Japan | |
| 0011976 | 1/1984 | Japan | 296/194 |
| 59-114165 | 7/1984 | Japan | |
| 0075063 | 4/1986 | Japan | 296/192 |
| 0134372 | 6/1987 | Japan | 296/192 |
| 2096066 | 10/1982 | United Kingdom | |
| 2142588 | 1/1985 | United Kingdom | |
| 2187683 | 9/1987 | United Kingdom | |
| 87/03846 | 7/1987 | World Int. Prop. O. | |

Primary Examiner—Johnny D. Cherry
Assistant Examiner—Joseph D. Pape
Attorney, Agent, or Firm—Foley & Lardner, Schwartz, Jeffery, Schwaab, Mack, Blumenthal & Evans

[57] ABSTRACT

A front structure for a modular vehicle body includes a dash lower panel, cowl box and a front pillar. The dash lower panel has at the upper end thereof a first horizontal flange formed with a first recess. The front pillar has at the front side waist portion thereof second and third flanges. The second flange is formed with second and fourth recesses at the front and rear end portion thereof. The third flange is formed with a third recess at a lateral end thereof. A first patch plate extends between the first and second flanges and is disposed in the first and second recesses while a second patch plate extends between the second and third flanges and is disposed in the fourth and third recesses such that the first and second patch plates cooperate with the first, second and third flanges to form a smoothly continuous joining surface with which a side portion of the cowl box is joined by interposing therebetween sealant adhesive.

15 Claims, 5 Drawing Sheets

FRONT STRUCTURE FOR MODULAR VEHICLE BODY

BACKGROUND OF THE INVENTION

1. Field of the Invention

The present invention relates to a front structure for a modular vehicle body.

2. Description of the Prior Art

Unitized bodies have been used for many of automobiles, particularly for most passenger cars. The unitized bodies however have a difficulty in installation of components and inspection of same since access to the spaces for disposition of the components is obstructed by the body section enclosing the spaces.

A modular vehicle body is free from the above difficulty since it is constituted by a plurality of independent body sections which are joined together after being painted and furnished with respective equipments independently.

The modular vehicle body however has a difficulty in attaining an assured seal thereof as compared with the unitized vehicle body.

SUMMARY OF THE INVENTION

In accordance with the present invention, there is provided a novel front structure for a modular vehicle body.

The front structure comprises a dash lower panel having at the upper end thereof a first horizontal flange, a front pillar having at the front side waist portion thereof a second horizontal flange, a patch plate extending between the first and second flanges and cooperating with same to form a smoothly continuous joining surface, sealant adhesive applied to the joining surface, and a cowl box having a cowl side panel and a side portion projecting outwardly from the cowl side panel. The side portion is laid upon the joining surface and secured to same by interposing therebetween the sealant adhesive.

The above structure is effective for solving the above noted problem inherent in the modular vehicle body.

It is accordingly an object of the present invention to provide a novel front structure for a modular vehicle body which makes it possible to attain as assured seal of the vehicle body with ease and efficiency.

It is another object of the present invention to proive a novel front structure for a modular vehicle body which can reduce the manufacturing and assembling expense.

DETAILED DESCRIPTION OF THE PREFERRED EMBODIMENT

Figure 1:
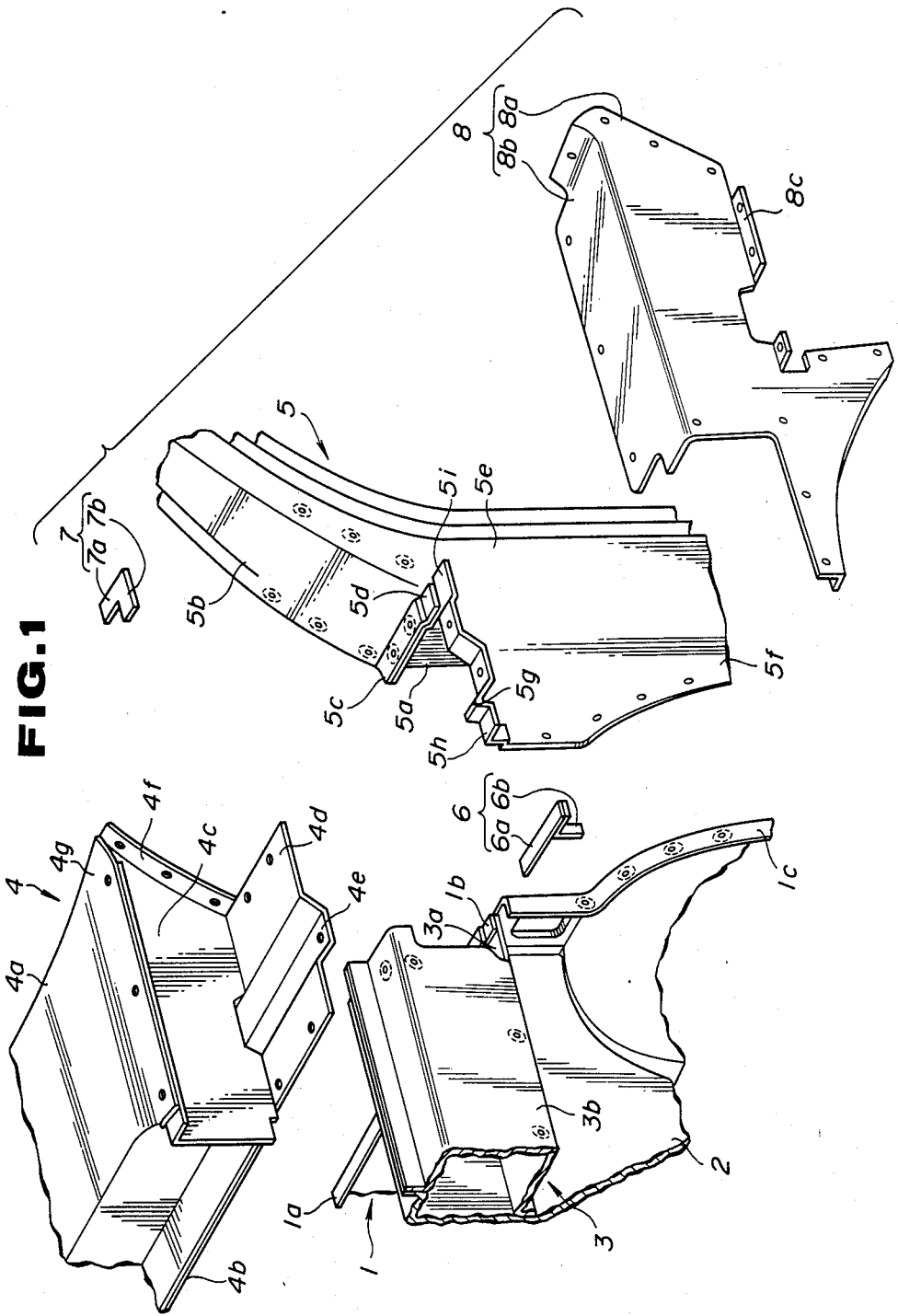
FIG. 1 is an exploded, perspective view of a front structure for a modular vehicle body according to an embodiment of the present invention.

Referring to FIGS. 1 to 5, a front structure for a modular vehicle body includes a dash lower panel 1 having at the upper end thereof a horizontal flange 1a extending forwardly therefrom. The flange 1a is elongated laterally of the vehicle body and has at a lateral end portion thereof a recess 1b. The dash lower panel 1 has a vertical lateral end where it is formed with a vertical flange 1c extending forwardly therefrom. A vertical hood ledge 2 extends forwardly from the dash lower panel 1 in such a way as to have a rear end located adjacently inwardly of the lateral end of the dash lower panel 1. A front hood ledge reinforce 3 is secured to the laterally outer surface of the upper end portion of the hood ledge 2 in such a way as to cooperate with the hood ledge 2 to constitute a rigid vehicle body portion of a box-like closed section and extending in the fore-and-aft direction of the vehicle body. The front hood ledge reinforce 3 has a lower panel portion 3a the rear end of which is secured to the lower surface of the lateral end portion of the horizontal flange 1a.

A cowl box 4 consists of a cowl top panel 4a located on the engine compartment side, a dash upper panel 4b located on the vehicle cabin side, and a cowl side panel 4c located at a lateral end of the vehicle cabin. The cowl box 4 is adapted to consitute a rigid vehicle body portion of a box-like closed section. The dash upper panel 4b has a lateral end extension projecting laterally outwardly from the cowl side panel 4c and constituting a side portion 4d of the cowl box 4. The side portion 4d is formed with a drip channel 4e in the form of a recess for drawing toward the outside of the vehicle body water having intruded into the cowl box 4 toward the outside of the vehicle body. The dash upper panel 4b further has an extension projecting laterally outwardly from the cowl side panel 4c and constituting an inclined flange 4f. The flange 4f is located at the rear rear end of the cowl side panel 4c and extends upwardly and rearwardly from the rear end of the side portion 4d. The cowl top panel 4a is secured at a lateral end thereof to the cowl side panel 4c, i.e., the cowl top panel 4a has at a lateral end thereof a horizontal flange 4g to which the upper flanged end of the cowl side panel 4b is secured.

A front pillar 5 has a pillar lower inner panel 5a and a pillar upper inner panel 5b. The pillar upper inner panel 5b has at the lower end thereof an integral flange 5c to which a flanged upper end of the pillar lower inner panel 5a is secured. The flange 5c is elongated laterally of the vehicle body and constitutes a horizontal flange of the front pillar 5 and is located at the front waist portion thereof. The flange 5c has at a lateral end thereof a recess 5d. The pillar upper inner panel 5b has at a laterally inner end thereof an inclined arcuated flange 5j extending upwardly and rearwardly from a laterally inner end portion of the flange 5c. The flange 5c and the flange 5j are integral and thus extends consecutively from each other to form a smoothly continuous joining surface. The front pillar 5 further has a pillar lower outer panel 5e and a dash side panel 5f. The dash side panel 5f is integrally secured to said pillar lower outer panel 5e and extending forwardly from same. The dash side panel 5f has at the upper end thereof a horizontal flange 5g extending laterally outwardly therefrom. The horizontal flange 5g is elongated in the fore-and-aft direction of the vehicle body and gnerally located at substantially the same level as the horizontal flange 5c. The horizontal flange 5g has at the front and rear end portions thereof recesses 5h and 5i and further has a recess 5k in which the drip channel 4e portion of the cowl box 4 fits.

A patch plate 6 is provided which extends between the flange 1a of the dash lower panel 1 and the flange 5g of the front pillar 5. The patch plate 6 consists of an elongated horizontal wall portion 6a and a bracket portion 6b extending downwardly from the longitudinally intermediate portion of the horizontal wall portion 6a. One half of the horizontal wall portion 6a is fitted in the recess 1b of the flange 1a and secured to same whilst the other half is fitted in the recess 5h of the flange 5h and secured to same. The bracket portion 6b is secured to the vertical flange 1c of the dash lower panel 1 in such a way as to be located laterally outward of same. When the patch plate 6 is disposed in the recesses 1b and 5h, the upper surface of the horizontal wall portion 6a becomes substantially flush with the upper surfaces of the horizontal flange 1a and the second horizontal flange 5g (refer to FIG. 3).

A patch plate 7 is provided which extends between the flange 5c and the flange 5g of the front pillar 5. The patch plate 7 has an L-like configuration and consists of a first horizontal wall portion 7a and a second horizontal wall portion 7b extending forwardly from an end of the first horizontal wall portion 7a. The first horizontal wall portion 7a is fitted in the recess 5d and secured to same whilst the second horizontal wall portion 7b is fitted in the recess 5i and secured to same. When the patch plate 7 is disposed in the recesses 5d and 5i, the upper surface of the first horizontal wall portion 7a becomes substantially flush with the upper surface of the flange 5c whilst the upper surface of the second wall portion 7b becomes substantially flush with the upper surface of the flange 5g (refer to FIG. 3).

A rear hood ledge reinforce 8 is provided which consists of a vertical wall portion 8a and an upper horizontal wall portion 8b extending laterally inwardly from the upper end of the vertical wall poriton 8a. The rear hood ledge reinforce 8 is disposed between the hood ledge 2 and the front pillar 5 to connect the hood ledge 2, front pillar 5, front hood ledge reinforce 3 and the cowl box 4 together. The rear hood ledge reinforce 8 cooperates with the cowl side panel 4c to constitute a rigid vehicle body portion of a box-like closed section which extends continuously from the aforementioned vehicle body portion constituted by the hood ledge 2 and the front hood ledge reinforce 3.

In assembly, the dash lower panel 1 equipped with the hood ledge 2 and the front hood ledge reinforce 3, the front pillar 5 equipped with the cowl box 4 and the patch plate 7 and the rear hood ledge reinforce 8 are prepared independently.

Figure 2:
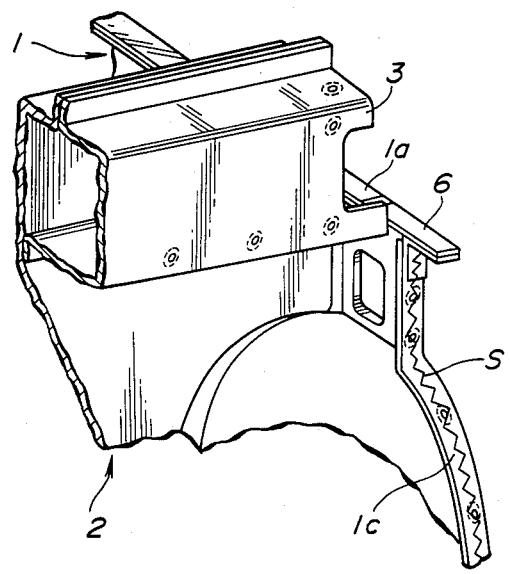
FIGS. 2 to 4 are perspective views of the front structure of FIG. 1 in its partly assembled states.
Figure 3:
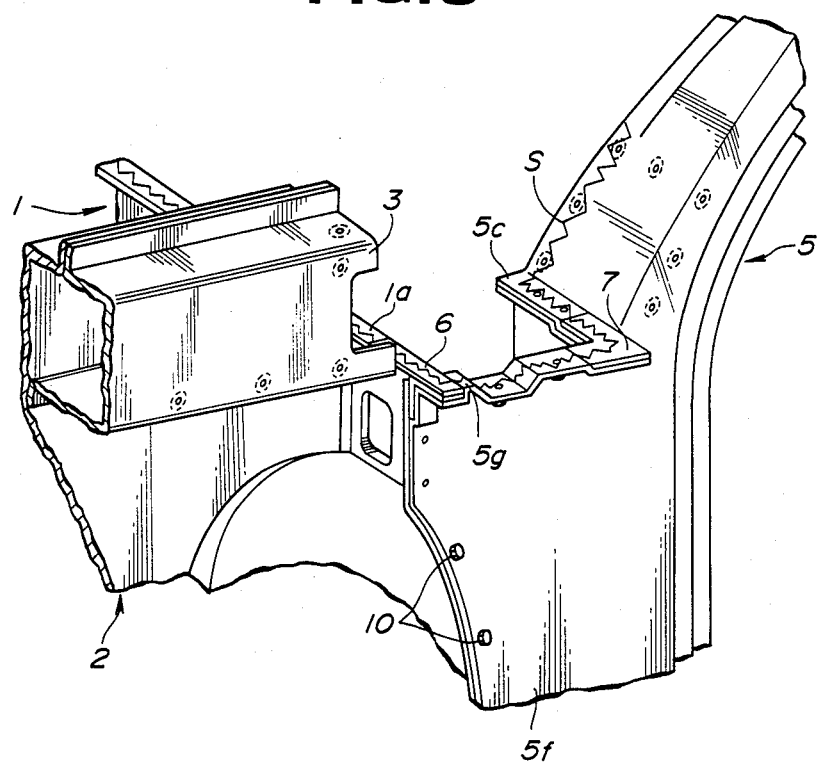

As shown in FIG. 2, sealant adhesive is applied to the vertical flange 1c of the dash lower panel 1 and the bracket portion 6b of the patch plate 6 by using a seal gun (not shown). Then, as shown in FIG. 3, the front end portion of the dash side panel 5f is fastened with bolts 10 to the vertical flange 1c of the dash lower panel 1. Thereafter, sealant adhesive S is applied to a joining surface constituted by the upper surfaces of the horizontal flange 1a, the patch plate 6, the first and second horizontal flanges 5c and 5g of the front pillar 5, the patch plate 7 and the flange 5j.

Figure 4:
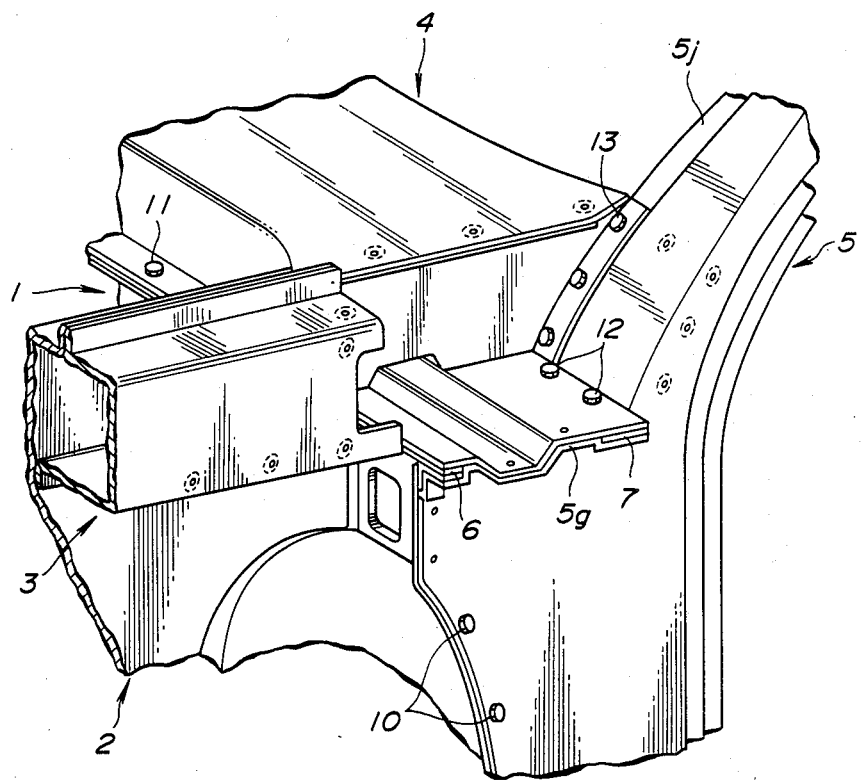

Then, as shown in FIG. 4, the cowl box 4 is disposed between the dash lower panel 1 and the front pillar 5 and secured to same. More specifically, the front end portion of the cowl box 4 is laid upon the horizontal flange 1a of the dash lower panel 1 and fastened to same with bolts 11. The side portion 4d of the cowl box 4 is laid upon the horizontal flange 5c of the front pillar 5 and fastened to same with bolts 12 whilst the inclined flange 4f of the cowl box 4 is laid upon an inside flange 5j of the front pillar 5 and fastened to same with bolts 13.

Figure 5:
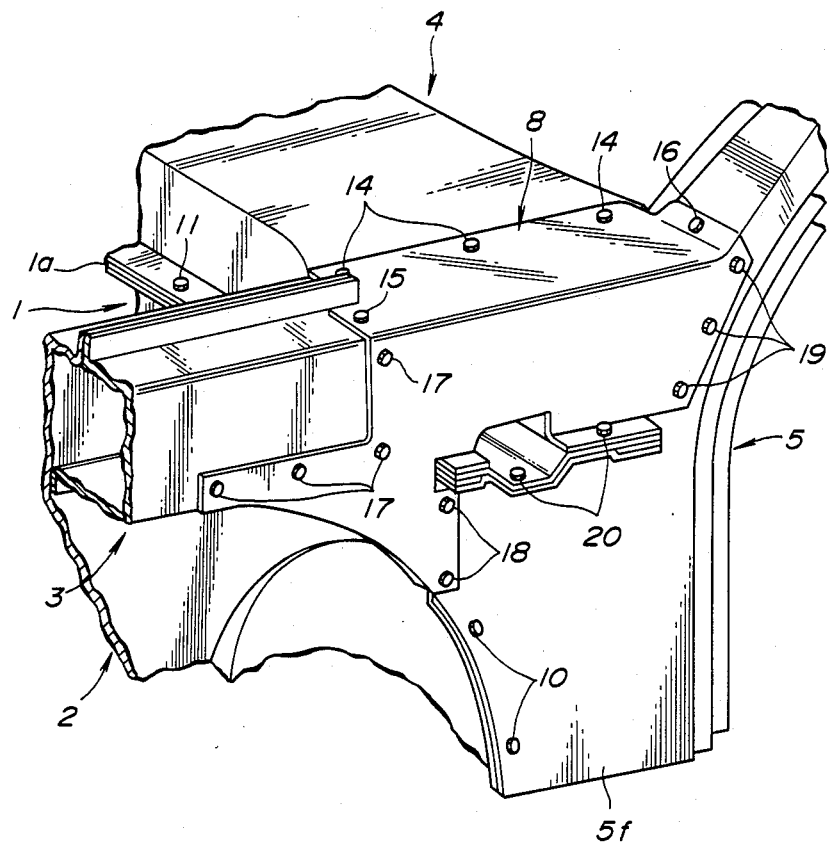
FIG. 5 is a perspective view of the front structure of FIG. 1 in its completely assembled state.

The rear hood ledge reinforce 8 in installed as shown in FIG. 5. More specifically, the upper wall 8b of the rear hood ledge reinforce 8 is laid upon the joining flange 4g of the cowl box 4 and the upper wall of the hood ledge 2 and fastened to same with bolts 14. The front end portion 3c of the upper wall 8b is laid upon the upper wall of the front hood ledge reinforce 3 and fastened to same with bolts 15 whilst the rear end portion of the upper wall 8b is laid upon the front wall of the front pillar 5 and fastened to same with bolts 16. The front end portion of the vertical flange 8a of the rear hood ledge reinforce 8 is laid upon the vertical flange 3b of the front hood ledge reinforce 3 and fastened to same with bolts 17. The front end portion of the vertical flange 8a is also laid upon the vertical flange 1c of the dash lowrer panel by interposing therebetween the dash side panel 5 and fastened to same with bolts 18. The rear end portion of the vertical flange 8a being laid upon the laterally outer wall of the front pillar 5 and fastened to same with bolts 19. A flange 8c provided to the lower part of the vertical flange 8a is laid upon the flange 5g of the front pillar 5 by interposing therebetween the side portion 4d and fastened to same with bolts 20. By this, the dash lower panel 1, cowl box 4, front pillar 5 and the rear hood ledge reinforce 8 are joined to constitute an integral body or unit.

In the above, it will be understood that the horizontal flange 1a of the dash lower panel 1 and the horizontal flanges 5c and 5g of the front pillar 5 cooperate with the patch plates 6 and 7 to constitute a smoothly continuous joining surface, thus making it possible to attain an assured seal of the front structure with ease and efficiency.

It will be further noted that since the horizontal flange 5c of the front pillar 5 is adapted to extend consecutively from the flange 5j, lack of sealant adhesive S does not occur either at the joint between the dash lower panel 1 and the front pillar 5 or at the joint between the dash lower panel 1 and the cowl box 4 or at the joint between the cowl box 4 and the front pillar 5, thus making it possible to prevent incomplete or defectively seal assuredly It will be further under stood that the front structure of this invention is adapted to be assembled with bolts screwed into in place by access thereto from the outside of the vehicle body, thus making it possible to assemble the front structure with ease and efficiency.

What is claimed is:

1. A front structure for a modular vehicle comprising:
   a dash lower panel having at the upper end thereof a first horizontal flange, said first horizontal flange having a first recess at an end thereof;
   a front pillar having at a front waist portion thereof a second horizontal flange, said second horizontal flange having a second recess at an end thereof;
   a patch plate extending between said first and second flanges and cooperating with same to form a smooth continuous joining surface, said patch plate being disposed in said first and second recesses so that an outer surface of said plate is substantially flush with adjacent outer surfaces of said first and second flanges;
   sealant adhesive applied to said joining surface; and
   a cowl box having a cowl side panel and a side portion projecting outwardly from said cowl side panel, said side portion being laid upon said joining surface and secured to same by interposing therebetween said sealant adhesive.

2. A front structure as set forth in claim 1 wherein said first flange is elngated laterally of the vehicle body and having at a lateral end said first recess.

3. A front structure as set forth in claim 2 wherein said second flagne is elongated longitudinally of the vehicle body and having at a front end thereof said second recess.

4. A front structure as set forth in claim 3 wherein said front pillar further includes a pillar lower outer panel and a dash side panel extending forwardly from said pillar lower outer panel, said dash side panel having at the upper end thereof said second flange.

5. A front structure as set forth in claim 4 further comprising a second patch plate, said front pillar further including a pillar upper inner panel having at the lower end thereof a third flange elongated laterally of the vehicle body, said second patch plate extending between said third flange and said second flange and cooperating with same to form a smoothly continuous joining surface with which said side portion of said cowl box is joined by interposing therebetween said sealant adhesive.

6. A front structure as set forth in claim 5 wherein said third flange having at a lateral end thereof a third recess, said second flange having at the rear end thereof a fourth recess, said second patch plate being disposed in said third and fourth recesses so that its outer surface is substantially flush with adjacent outer surfaces of said second and third flanges.

7. A front structure as set forth in claim 6 wherein said front pillar 5 further includes a pillar lower inner panel having at the upper end thereof a fourth flange secured to said third flange.

8. A front structure as set forth in claim 7 wherein said piller upper inner panel has at a laterally inner end thereof a fourth flange extending upwardly and rearwardly from said third flange, said fourth flange being integral with said third flange and extending consecutively therefrom so as to form a smoothly continuous joining surface for joining with said cowl box.

9. A front structure as set forth in claim 8 wherein said cowl box has at the rear end of said cowl side panel an inclined fifth flange extending upwardly and rearwardly from the rear end of said side portion, said fifth flange being joined with said fourth flange ofsaid pillar upper inner panel by interposing therebetween said sealant adhesive.

10. A front structure as set forth in claim 9 wherein said cowl box further has a cowl top panel secured at a lateral end thereof to said cowl side panel and a dash upper panel cooperating with said cowl top panel to constitute a vehicle body portion of a box-like closed section, said cowl top panel and said dash upper panel being joined at the front end thereof with said first flange.

11. A front structure as set forth in claim 10 wherein said dash lower panel has at a lateral end thereof a vertical flange with which the front end of said dash side panel is joined.

12. A front structure as set forth in claim 11 wherein said first patch plate having a depending bracket portion joined with said vertical flange.

13. A front structure as set forth in claim 12, further comprising a hood ledge extending forwardly from said dash lower panel in such a way as to have a rear end located adjacently inward of said lateral end of said dash lower panel.

14. A front structure as set forth in claim 13, further comprising a front hood ledge reinforce secured to an upper end portion of said hood ledge and cooperating with same to constitute a vehicle body portion of a box-like closed section.

15. A front structure as set forth in claim 14, further comprising a rear hood ledge reinforce having a horizontal upper wall portion joined with a lateral end of said cowl top panel and extending laterally outwardly therefrom, said rear hood ledge reinforce further having a vertical wall portion depending from a laterally outward end of said upper wall portion, said vertical wall portion being joined at a rear end portion thereof with said front pillar outer panel and at a front end portion thereof with said hood ledge and said front hood ledge reinforce, said upper wall portion being further joined at a front end thereof with said front hood ledge reinforce and at a rear end thereof with said front pillar outer panel, said rear hood ledge reinforce cooperating with said cowl box to constitute a vehicle body portion of a box-like closed section extending continuously from said vehicle body portion constituted by said hood ledge and said front hood ledge reinforce.

* * * * *